R. S. WALKER.
SNAIL AND SLUG TRAP.
APPLICATION FILED APR. 3, 1919.
1,327,579.
Patented Jan. 6, 1920.
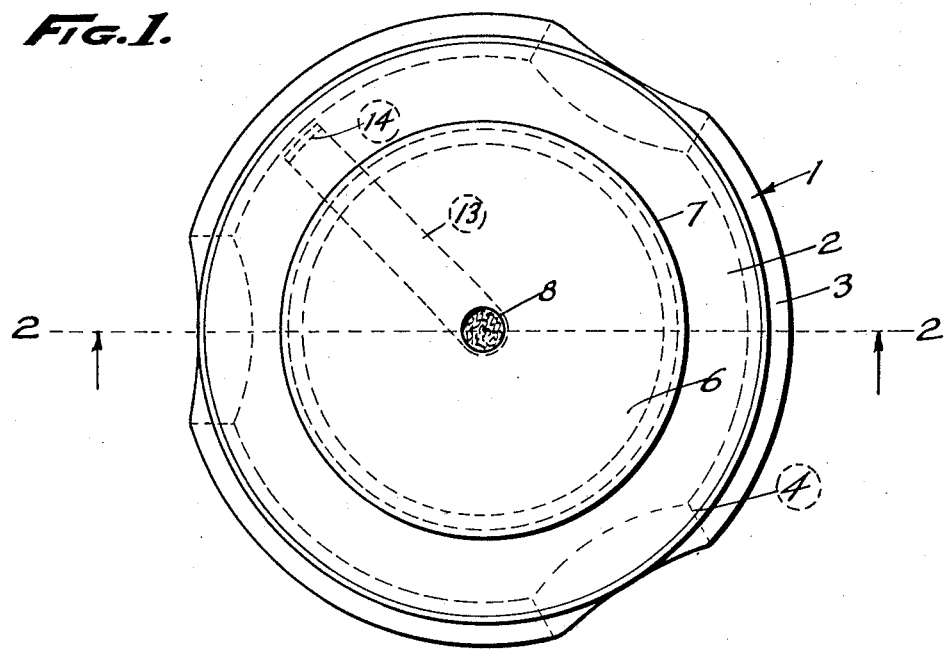
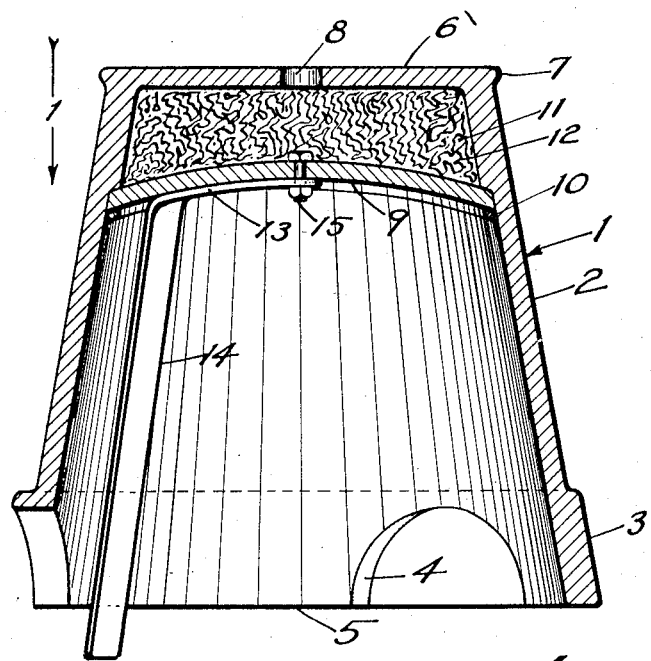
INVENTOR.
Roy S. Walker.
BY Hazard and Miller
ATTORNEYS.

UNITED STATES PATENT OFFICE.

ROY S. WALKER, OF PASADENA, CALIFORNIA, ASSIGNOR TO L. R. ALDERMAN & CO., OF PASADENA, CALIFORNIA, A PARTNERSHIP CONSISTING OF LEIGHTON R. ALDERMAN AND ASBURY G. SMITH.

SNAIL AND SLUG TRAP.

1,327,579.      Specification of Letters Patent.      Patented Jan. 6, 1920.

Application filed April 3, 1919. Serial No. 287,267.

*To all whom it may concern:*

Be it known that I, ROY S. WALKER, a citizen of the United States, residing at Pasadena, in the county of Los Angeles and State of California, have invented new and useful Improvements in Snail and Slug Traps, of which the following is a specification.

My object is to make a snail and slug trap, and my invention consists of the novel features herein shown, described and claimed.

Snails and slugs are a pest difficult to deal with for the reason that preparations, such as lime, used in killing them, are injurious to the vegetation which they attack. During the day they burrow in the moist ground and it is during the night that they make their depredations, and at that time of course it is difficult to gather or kill them.

The present invention takes advantage of the fact that snails and slugs are fond of cool and moist places and also that they are attracted by sweet substances and various plant juices and ethereal oils such as juices obtained from citrus fruits.

The present invention provides a cool, dark and moist trap baited with a liquid, preferably impregnated with a substance attractive to the snails and slugs.

Figure 1 is a top plan view of a snail and slug trap embodying the principles of my invention as seen looking in the direction indicated by the arrow 1 in Fig. 2.

Fig. 2 is a vertical diametrical sectional detail on the line 2—2 of Fig. 1 and looking in the direction indicated by the arrows.

The main body of the snail and slug trap 1 is made like an inverted flowerpot and consists of the downwardly and outwardly flaring wall 2, the enlargement or bead 3 around the lower edge of the wall, the arch-shaped openings 4 formed from the lower edge 5 through the enlargement 3 and through the lower edge of the wall 2, the top 6 formed integral with the upper edge of the wall 2 and having a bead 7 extending outwardly all the way around, and a central opening 8.

The bodies are made of clay and may be unglazed throughout or the outer face may be glazed. In making and handling the bodies they are kept bottom side up like flowerpots and may be nested.

A supplemental top 9 is inserted upwardly into the wall 2 and fastened in place by hydraulic cement 10 to form a chamber 11 between the main top 6 and the supplemental top 9, and the chamber 11 is filled with a substance like sawdust, moss, or the like, and filled with water impregnated with one of the substances attractive to the snails and slugs. The supplemental top 9 is unglazed clay.

The snails and slugs are fond of sugar, but ordinary sugar is objectionable because of its liability to ferment, and it is therefore preferable to use a minute quantity of an unfermentable sweet substance, such as saccharin. Of course, the filler 12 in the chamber 11 is placed in position before the supplemental top 9 is cemented in position. The attractive substance may be inserted from time to time through the opening 8.

A metal bar is cut and bent to form the scraper blades 13 and 14. The central pivot bolt 15 is inserted through the inner end of the blade 13 and through the center of the supplemental top 9, so that the blade 13 fits against the lower face of the top 9, and so that the blade 14 fits against the inner face of the wall 2 below the top 9 and may be rotated.

The traps are prepared and set in places to be frequented by the snails and slugs at night, and every morning the traps will be cleared of the accumulated snails and slugs by washing and by operating the scraper blades 13 and 14.

The principal requirement is to keep the unglazed porous clay saturated with water and baited with substance attractive to the snails and slugs, and to set the traps in places frequented at night by the snails and slugs.

Thus I have produced a simple and effective snail and slug trap, the special features of which are an inverted porous pot having a chamber in its upper part adapted to receive moisture and bait and adapted to distribute the moisture and bait by gravity and capillary attraction to the inner wall of the pot, there being means providing access to the inner wall of the pot for the snails and slugs.

Various changes may be made without departing from the spirit of my invention as claimed.

I claim:

1. A snail and slug trap comprising an inverted pot of porous material having means for keeping the walls of the pot moist, the said pot having an inlet opening at its lower end.

2. A snail and slug trap comprising an inverted pot having openings formed through its lower edge, a supplemental top mounted below the main top and forming a chamber, and snail and slug bait in the chamber.

3. A snail and slug trap comprising a porous inverted pot having a chamber in its upper part adapted to receive moisture and bait and adapted to distribute the moisture and bait to the inner face of the pot by gravity and capillary attraction, said pot having an opening providing access to the inner face of the pot for the snails and slugs.

4. A snail and slug trap comprising an inverted pot made of porous material and having means for keeping the walls of the pot moist, the said pot being provided at its lower end with an inlet opening and a revoluble scraper for scraping the inner faces of the side walls.

5. A snail and slug trap comprising an inverted pot of porous material, said pot having an inlet opening in the lower portion of its side wall, means for supplying moisture to the side walls of the pot, and a revoluble scraper pivoted to the top of the pot for scraping the inner faces of the top and the side walls.

In testimony whereof I have signed my name to this specification.

ROY S. WALKER.